(12) United States Patent
Fontecchio et al.

(10) Patent No.: US 7,273,232 B2
(45) Date of Patent: Sep. 25, 2007

(54) SEAT-BELT WEBBING GUIDE FOR COUPES AND CONVERTIBLES

(75) Inventors: Robert Fontecchio, Clarkston, MI (US); Dale Soffa, Macomb, MI (US); Olivier Boinais, West Bloomfield, MI (US)

(73) Assignee: Faurecia Automotive Seating Canada Limited, Mississauga, Ontario (CA)

( * ) Notice: Subject to any disclaimer, the term of this patent is extended or adjusted under 35 U.S.C. 154(b) by 244 days.

(21) Appl. No.: 11/038,203

(22) Filed: Jan. 21, 2005

(65) Prior Publication Data

US 2005/0248145 A1 Nov. 10, 2005

Related U.S. Application Data

(60) Provisional application No. 60/569,460, filed on May 10, 2004.

(51) Int. Cl.
*B60R 22/00* (2006.01)

(52) U.S. Cl. ..................... 280/808; 297/483

(58) Field of Classification Search ............. 280/801.1, 280/808, 801.2; 297/473, 481, 483
See application file for complete search history.

(56) References Cited

U.S. PATENT DOCUMENTS

| | | | |
|---|---|---|---|
| 3,521,901 A | 7/1970 | Wackym | |
| 3,995,885 A | 12/1976 | Plesniarski | |
| 4,060,260 A | 11/1977 | Collins | |
| 4,323,278 A | 4/1982 | Sukopp et al. | |
| 4,541,654 A | 9/1985 | Jonasson | |
| 4,684,153 A | 8/1987 | Miller | |
| 4,730,875 A | 3/1988 | Yoshitsugu | |
| 5,263,741 A | 11/1993 | Seros et al. | |
| 5,350,196 A * | 9/1994 | Atkins | 280/808 |
| 5,730,499 A | 3/1998 | Salisbury, Jr. | |
| 5,897,169 A * | 4/1999 | Larsen et al. | 297/483 |
| 6,152,533 A | 11/2000 | Smuk | |
| 6,224,105 B1 * | 5/2001 | Lake | 280/801.1 |
| 6,592,149 B2 * | 7/2003 | Sessoms | 280/801.1 |
| 6,749,150 B2 | 6/2004 | Kohlndorfer et al. | |
| 6,749,223 B2 * | 6/2004 | Kazuo et al. | 280/801.1 |
| 2005/0127659 A1 * | 6/2005 | Hearn et al. | 280/801.1 |

* cited by examiner

*Primary Examiner*—Paul N. Dickson
*Assistant Examiner*—Barry Gooden, Jr.
(74) *Attorney, Agent, or Firm*—Patrick J. Hofbauer; Kevin E. Holbeche

(57) ABSTRACT

A webbing guide for redirecting a seat-belt webbing in a vehicle, having a seat-belt system, and a vehicle seat assembly. This webbing guide allows the seat-belt webbing to be readily secured to and released from the upper portion of the seatback member of the vehicle seat assembly. The preferred webbing guide comprises a guide body mountable to the upper portion of the seatback member of the vehicle seat assembly. An arm member pivotally engages the guide body, and is thereby movable between an open configuration and a closed configuration for selectively securing the seat-belt webbing to the guide body in readily releasable relation. Further embodiments provide means, such as magnetically biasing means, for releasably retaining the arm member in the closed configuration. This webbing guide is especially useful in relation to vehicle seat assemblies of the type having a seatback member tippable between an upright and occupiable, deployed design configuration and a tipped configuration, which affords ready access rearward of the vehicle seat. The webbing guide is useful for overcoming the inconveniences posed by prior-art webbing guides.

21 Claims, 7 Drawing Sheets

SEAT-BELT WEBBING GUIDE FOR COUPES AND CONVERTIBLES

FIELD OF THE INVENTION

This invention relates to safety restraints for motor vehicles, and more particularly, to a seat-belt webbing guide for redirecting a seat-belt webbing to a location adjacent to an upper portion of a seatback member of a vehicle seat assembly for the comfort of the occupant.

BACKGROUND OF THE INVENTION

Three-point motor vehicle occupant seat-belt restraint systems having a seat-belt webbing are well known. These seat-belt systems typically comprise a single length of seat-belt webbing with continuous lap and shoulder webbing portions, which when in use, are disposed across both a front seat assembly occupant's lap and chest so as to prevent movement of the upper torso as well as movement of the lower portion of the torso in the event of a collision.

One end of the seat-belt webbing is typically wound on a webbing recoiling-tensioning device located on a floor or outer side wall of the vehicle. The recoiling-tensioning device stores excess seat-belt webbing. Furthermore, when the seat-belt webbing is not in use, the recoiling-tensioning device provides the vehicle with an aesthetically appealing, neat, appearance, by retaining the seat-belt webbing out of the way. These recoiling-tensioning devices are typically of the automatic locking type so as to lock the seat-belt webbing against pull-out upon the initial winding of the seat-belt webbing after being pulled from a fully stored condition. These recoiling-tensioning devices are also typically of the inertia type so that the belt is locked against pull-out in response to abrupt belt pulls and/or in response to abrupt vehicle acceleration or deceleration.

The opposite, other end of the seat-belt webbing is typically secured to the vehicle's floor or outer side wall by an anchor plate. An intermediate portion of the seat-belt webbing is hung through a slip ring, commonly known as a "D-ring". The D-ring is located on a central vehicle pillar, commonly termed a "B-pillar", so as to guide the seat-belt webbing to a zone which is generally accessible to a front seat assembly occupant. A tongue plate is slidably carried by the intermediate portion of the seat-belt webbing that is between the D-ring and the anchor plate.

The front seat assembly occupant uses such a seat-belt system when seated in a respective seat assembly by gripping the tongue plate and pulling the seat-belt webbing laterally across his/her chest to engage the tongue plate with a buckle device attached to the vehicle floor or to the seat-cushion of the seat assembly adjacent to a laterally inboard edge of said seat cushion member so as to releasably engage the buckle device in a fastened configuration. When the front seat assembly occupant disengages the tongue plate from the buckle device so as to release the seat-belt system from the fastened configuration, the seat-belt webbing retracts so as to be wound onto the recoiling-tensioning device by the reeling force of the device, and the tongue plate moves outwardly toward the rear of the vehicle together with the seat-belt webbing. In this manner, when the seat-belt system is not in use, the tongue plate resting position is substantially adjacent on the B-pillar, proximate to the D-ring.

A two-door passenger motor vehicle (coupe or convertible) is commonly provided with front seat assemblies having seatbacks, which are tippable between a deployed design configuration, and a forwardly tipped configuration. In the deployed design configuration, the seatback member is locked in an upright and occupiable position. In the tipped configuration the seatback member is forwardly tipped over the seat cushion member, for facilitating passenger access into and out of the rear seat area. Tipping of the seatback member is achieved by operating an actuating element, typically provided on, or adjacent to, the outboard side of the seatback member, to release a locking element allowing the seatback member to be forwardly tipped.

In general, such two-door vehicles have relatively wide doors, requiring the B-pillar to be located further behind the front seat assembly occupant than would be the case in a four-door vehicle of the same general type. Accordingly, seat-belt systems mounted on the B-pillar of two-door vehicles, are typically anchored significantly behind the perspective front vehicle seat assembly. Thus, when not in use, the seat-belt webbing is placed in an unfavourable position on the B-pillar where it cannot easily be reached by the occupant sitting in a front seat assembly, especially when the seat assembly is in a foremost longitudinally adjusted position.

Accordingly, when the front seat assembly occupant attempts to put on and buckle the seat-belt system after sitting in the front seat assembly, s/he has to grasp at the seat-belt webbing by significantly twisting his/her upper torso toward the outboard rear of the vehicle.

In order to avoid this inconvenience, as well as to situate the seat-belt webbing in a more comfortable position while it is worn by the front seat assembly occupant, an annular seat-belt webbing guide is occasionally mounted on, or adjacent to, the outboard side of the seatback member. This known solution provides the advantage of retainingly positioning the seat-belt webbing forwardly, and inwardly away from the B-pillar, so as to be closer in relation to the front seat assembly occupant, thereby allowing the front seat assembly occupant to quickly and easily grasp the seat-belt webbing for the purpose of buckling same. Variations on this design include, for example, U.S. Pat. No. 5,897,169 to Larsen et al. issued Apr. 7, 1999, and U.S. Pat. No. 5,731, 499 to Salisbury, Jr. issued Mar. 24, 1998.

While such seat-belt webbing guides provide advantages over prior webbing guide arrangements, they carry with them their own shortcomings. One disadvantage of this type of annular seat-belt webbing guide is that it does not allow for the seat-belt webbing to be disengaged from the webbing guide. As mentioned earlier, in two-door vehicles, access to the rear seating area is obtained by tipping the front seatback member forward and then reaching on stepping through the front door opening. In such two-door vehicles, the aforedescribed front seat-belt system complicates access to the rear seating area through the front door opening when the front seatback member is forwardly tipped. That is, with the front seatback member positioned in the tipped configuration and the seat-belt webbing passing through the annular webbing guide, the seat-belt webbing extends across the door opening between the front seatback member and the B-pillar, thereby creating an obstacle for persons attempting to gain access to the rear seat area of the vehicle.

This problem has been overcome to some extent through the use of penannular seat-belt webbing guides. These improved webbing guides are typically annular, and further comprise a slot to the centre of the annular through which the seat-belt webbing may be inserted or removed. U.S. Pat. No. 4,731,875 to Yoshitsugu, issued Mar. 15, 1988, is an improvement on the basic annular webbing guide design, and illustrates several art variations on this improved concept. The generally C-shaped webbing guide of Yoshitsugu allows the seat-belt webbing to be released therefrom in order to facilitate passenger ingress and egress from the rear seating area of the vehicle.

One disadvantage of such improved seat-belt webbing guides are that it is difficult to quickly and easily insert and withdraw the seat-belt webbing therefrom, especially by an occupant already seated in the front seat assembly. A solution to this problem had been proposed in U.S. Pat. No. 4,323,278 to Sukopp et al. issued Apr. 6, 1982. The Sukopp et al. patent discloses a seat-belt webbing guide, which is essentially an upwardly-bent hook, mounted to a side of the seat-back member. While the solution taught by this patent improves the ease with which fitting of the seat-belt webbing on to and off from the seat-belt webbing guide can be accomplished, it also has disadvantages. For example a problem with this design is that the seat-belt webbing is not secured to the seat-belt webbing guide, thereby, allowing for the seat-belt webbing to slide off from it too easily. When the seat-belt webbing does slide off from the seat-belt webbing guide, all advantage of the webbing guide is lost, as the occupant of the front seat assembly must now grasp the seat-belt webbing by significantly twisting his upper torso toward the outboard rear of the vehicle.

It is also known to provide a seat-belt system integrally mounted on the vehicle seat assembly. This type of arrangement is known as All Belts To Seat, or "ABTS". For example, in certain vehicles (e.g. high end convertibles), a B-pillar is not present for seat-belt webbing or D-ring attachment. Integrally formed ABTS seat-belt systems, while effective, significantly increase production expense and require more robust seat assembly designs. Such seat assembly designs are generally much more expensive to produce and add considerable weight to the vehicle, as the entire seat assembly must be made more robust to handle the additional crash-loading placed by such designs on the seat assembly.

In view of the foregoing, it is be desirable to provide an improved seat-belt webbing guide for use with front seat assemblies of two-door coupes and convertibles, which guide significantly overcomes the inadequacies and shortcomings of the prior art, without the need to resort to an ABTS design.

More particularly, it is an object of the present invention to provide an improved webbing guide which allows for quick and easy selective disengagement of the seat-belt webbing from the webbing guide upon forward tipping of the seatback of a front seat assembly in a two-door vehicle to facilitate ease of access to the rear seating area of such a vehicle.

It is a further object of the present invention to provide an improved webbing guide of the type just described which additionally allows a front seat assembly occupant seated in the front seat assembly of a two-door vehicle to readily and conveniently selectively secure the seat-belt webbing to the webbing guide without significant twisting or turning of his/her upper torso, thereby to readily have the seat-belt webbing redirected by said improved webbing guide to a convenient location adjacent to an upper portion of the seatback member for easy grasping by said seat assembly occupant to facilitate subsequent buckling operations.

SUMMARY OF THE INVENTION

In accordance with the present invention there is disclosed an improved webbing guide for redirecting a seat-belt webbing to a location adjacent to an upper portion of a seatback member of a vehicle seat assembly. The webbing guide comprises a guide body mountable on the upper portion of the seatback member, and securing means engaging the guide body for selectively securing the seat-belt webbing to the guide body in readily releasable relation. The securing means is moveable between a closed configuration and an open configuration, wherein, in the closed configuration, the seat-belt webbing is selectively securable to the guide body, while in the open configuration, the seat-belt webbing is readily releasable from the guide body. The guide body defines a guide cavity for admitting the seat-belt webbing. The guide body also comprises a first guide portion and a second guide portion, which together define a web-receiving passage for facilitating insertion of the seat-belt webbing into the guide cavity, when the securing means is in the open configuration.

According to an aspect of the present invention the securing means may comprise an arm member having a first arm end portion, a second arm end portion, and an intermediate arm portion substantially juxtaposed therebetween. The intermediate arm portion is securely and pivotally mounted on the first guide portion, such that the second arm end portion is releasably and substantially engagable with the second guide portion, when the arm member is in the closed configuration. When the arm member is in the open configuration, the second arm end portion is spaced from the second guide portion.

According to another aspect of the present invention the guide body may comprise means for releasably retaining the arm member in the closed configuration. Preferably, the means for releasably retaining the arm member may comprise a magnetic biasing means for magnetically biasing the arm member towards the closed configuration.

According to yet another aspect of the present invention the arm member may comprise an urging means for pivotally moving the arm member from the open configuration, when the seat-belt webbing engages the urging means during insertion of the seat-belt webbing into the guide cavity as aforesaid. Conveniently the urging means may comprise a web-engaging surface positioned on the arm member substantially adjacent to the first arm end portion, such that the web-engaging surface is engagable by the seat-belt webbing during insertion of the seat-belt webbing into the guide cavity as aforesaid.

According to a further aspect of the present invention the arm member may further comprise gripping means for manually gripping the arm member for movement thereof between the open configuration and the closed configuration, as aforesaid. Conveniently the gripping means may comprise at least one substantially concave depression located proximate to the second arm end portion.

According to yet another aspect of the present invention the upper portion of the seatback member may include a headrest member which may be slidably interconnected to the seatback member through at least one headrest post, and the headrest member may be vertically adjustable along the axis of the at least one headrest post. Conveniently, the guide body may be rigidly mountable on an underside of the headrest member by a mounting bracket extending from the guide body in encircling relation to the at least one headrest post.

According to yet a further embodiment of the present invention the guide body may further comprise an arm guiding groove engagable by the arm member for restricting movement of the arm member to one plane. Conveniently the arm guiding groove may be engageable by the first arm end portion.

In accordance with another aspect of the present invention there is disclosed a webbing guide for redirecting a seat-belt webbing in a vehicle having a seat-belt system and a seat assembly of the type having a seat back member tippable between an upright, occupiable, deployed design configuration, and a tipped configuration affording ready access rearwardly of said vehicle seat assembly. The webbing guide comprises a guide body mountable to an upper portion of the seatback member. The guide body has a first guide portion and a second guide portion and the guide body defines a guide cavity for admitting the seat-belt webbing. An arm member having a first arm end portion, a second arm end portion, and an intermediate arm portion substantially juxtaposed therebetween, is securely and pivotally mounted on the first guide portion at the intermediate portion. The pivotal mounting of the arm member to the guide body at the intermediate portion constitutes the arm member as a first class lever, wherein the arm member is movable between an open configuration and a closed configuration. The first arm end portion defines a web-engaging surface which is engageable by the seat-belt webbing during insertion of the seat-belt webbing into the guide cavity when the arm member is substantially in the open configuration. The web-engaging surface is intended for leveraging the arm member from the open configuration when engaged by the seat-belt webbing. A first one of the first guide portion and the first arm end portion has a magnetized portion, and a respective other one of the first guide portion and the first arm end portion has a ferric portion. Furthermore, a first one of the guide body and the intermediate arm portion comprises a pintle, and a respective other one of the guide body and the intermediate arm portion defines a pintle bearing which operatively engages the pintle for pivotal movement of the arm member as aforesaid. In the closed configuration the second arm end portion releasably engages the second guide portion with the assistance of the interaction between the magnetized portion and the ferric portion, allowing the seat-belt webbing to be selectively securable to the guide body within the guide cavity. In the open configuration the second arm end portion is spaced from the second guide portion, allowing the seat-belt webbing to be readily releasable from the guide cavity of the guide body.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the present invention, as to its structure, organization, use and method of operation, together with further objects and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 1b is a blown-up perspective view of the encircled area 1b of FIG. 1a;

FIG. 2b is a blown-up perspective view of the encircled area 2b of FIG. 2a;

FIG. 4 is an exploded front, bottom perspective view of the webbing guide of FIG. 2a, illustrating the mounting of the webbing guide on to the underside of the headrest member of FIG. 2a.

DETAILED DESCRIPTION OF THE PRIOR-ART

Figure 1A:
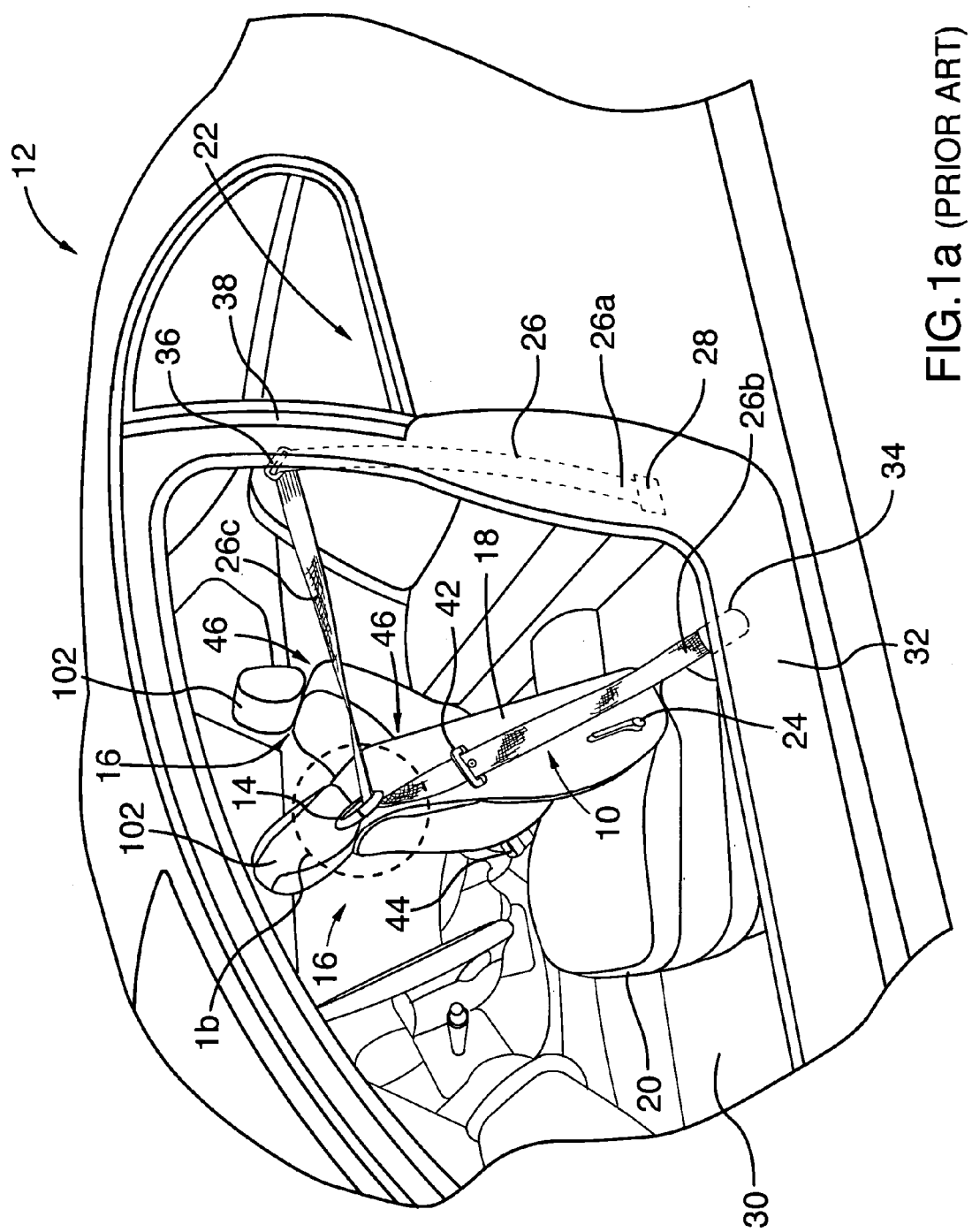
FIG. 1a is a front, side perspective view of a prior-art three-point seat-belt system mounted in a two-door motor vehicle in conjunction with a prior-art seat-belt webbing guide, illustrating the position of the seat-belt webbing when the seatback member is tipped in the fore direction such as to allow access to the rear seat area of the motor vehicle.

Referring now to the figures, wherein like elements are given like reference numbers throughout, there is shown in FIG. 1a, a perspective view of a conventional (prior-art) three-point seat-belt system 10 mounted in a two-door motor vehicle 12 in conjunction with a prior-art seat-belt webbing guide 14. As shown in FIG. 1a, the two-door passenger motor vehicle 12 (coupe, as shown, or convertible, not shown) is commonly provided with two conventional front seat assemblies 16, each having a seatback member 18, which is tippable between a deployed design configuration (depicted in FIG. 2a), and a forwardly tipped configuration (depicted in FIG. 1a). In the deployed design configuration (FIG. 2a), the seatback member 18 is locked in an upright and occupiable position. In the tipped configuration (FIG. 1a), the seatback member 18 is forwardly tipped over a seat-cushion member 20, for facilitating access into and out of the rear seat area 22 of the vehicle 12. Tipping of the seatback member 18 is achieved, for example, by operating an actuating element 24, typically provided on, or adjacent to, the outboard side of the seatback member 18, to release a locking element, thereby allowing the seatback member 18 to be forwardly tipped (FIG. 1a).

The prior-art seat-belt systems 10 used with such conventional front seat assemblies 16 typically comprise a single length of seat-belt webbing 26. Typically, a seat-belt webbing 26 is associated with each front seat assembly 16. One end 26a of the seat-belt webbing 26 is typically wound on a webbing recoiling-tensioning device 28 located near the vehicle floor 30 on the outer side wall 32 of the vehicle 12, adjacent to the outboard edge of the vehicle seat assembly 16. As shown, the opposite, other end 26b of the seat-belt webbing 26 is also typically secured to the outer side wall 32, adjacent to the outboard edge of the respective seat assembly 16, by means of an anchor plate 34, although the anchor plate 34 may, alternatively be affixed to the vehicle floor 30. An intermediate portion of the seat-belt webbing 26c passes through a slip ring, commonly known as a "D-ring" 36, in vertically spaced relation from the vehicle floor 30. The D-ring 36 is located on a central vehicle pillar, commonly termed a "B-pillar" 38, so as to guide the seat-belt webbing 26 to a zone which is generally accessible to a front seat assembly occupant 40. A tongue plate 42 is slidably carried by the intermediate portion 26c of the seat-belt webbing 26 that is between the D-ring 36 and the anchor plate 34.

The front seat assembly occupant 40 uses such a seat-belt system 10, when seated in a respective seat assembly 16, by gripping the tongue plate 42 and pulling the seat-belt webbing 26 laterally across his/her chest to engage the tongue plate 42 with a buckle device 44 attached to the vehicle floor 30, or to the seat-cushion 20 of the seat assembly 16 adjacent to a laterally inboard edge of the seat-cushion member 20, so as to releasably engage the buckle device 44 in a fastened configuration. When the front seat assembly occupant 40 disengages the tongue plate 42 from the buckle device 44 so as to release the seat-belt system 10 from the fastened configuration, the seat-belt webbing 26 retracts so as to be wound onto the recoiling-tensioning device 28 by the reeling force of the device 28, and the tongue plate 42 moves outwardly, toward the rear of the vehicle 12, together with the seat-belt webbing 26. In this manner, when the seat assembly 16 is in its deployed design configuration and the seat-belt system 10 is not in use, the resting position of the tongue plate 42 is substantially adjacent to the B-pillar 38, and proximate to the D-ring 36.

In general, two-door vehicles 12 have relatively wide doors (not shown), requiring the B-pillar 38 to be located further behind a front seat assembly occupant 40 than in a four-door vehicle of the same general type. Accordingly, seat-belt systems 10 mounted on the B-pillar 38 of two-door vehicles 12 are typically anchored significantly behind the respective front seat assembly 16 as can be seen in FIG. 1a. Thus, when not in use, the seat-belt webbing 26 is placed in an unfavourable position on the B-pillar 38 where it cannot easily be reached by the vehicle occupant 40 sitting in the front seat assembly 16, especially when the front seat assembly 16 is in a foremost longitudinally adjusted position.

Accordingly, when the front seat assembly occupant 40 attempts to put on, and buckle the seat-belt system 10 after sitting in the front seat assembly 16, s/he has to grasp at the seat-belt webbing 26 by significantly twisting his/her upper torso toward the outboard rear of the vehicle 12.

In order to mitigate this inconvenience, as well as to situate the seat-belt webbing 26 in a more comfortable position while it is worn by the front seat assembly occupant 40, a prior-art seat-belt webbing guide 14 is occasionally mounted on, or adjacent to, an upper portion 46 of the outboard side of the seatback member 18.

Figure 1B:
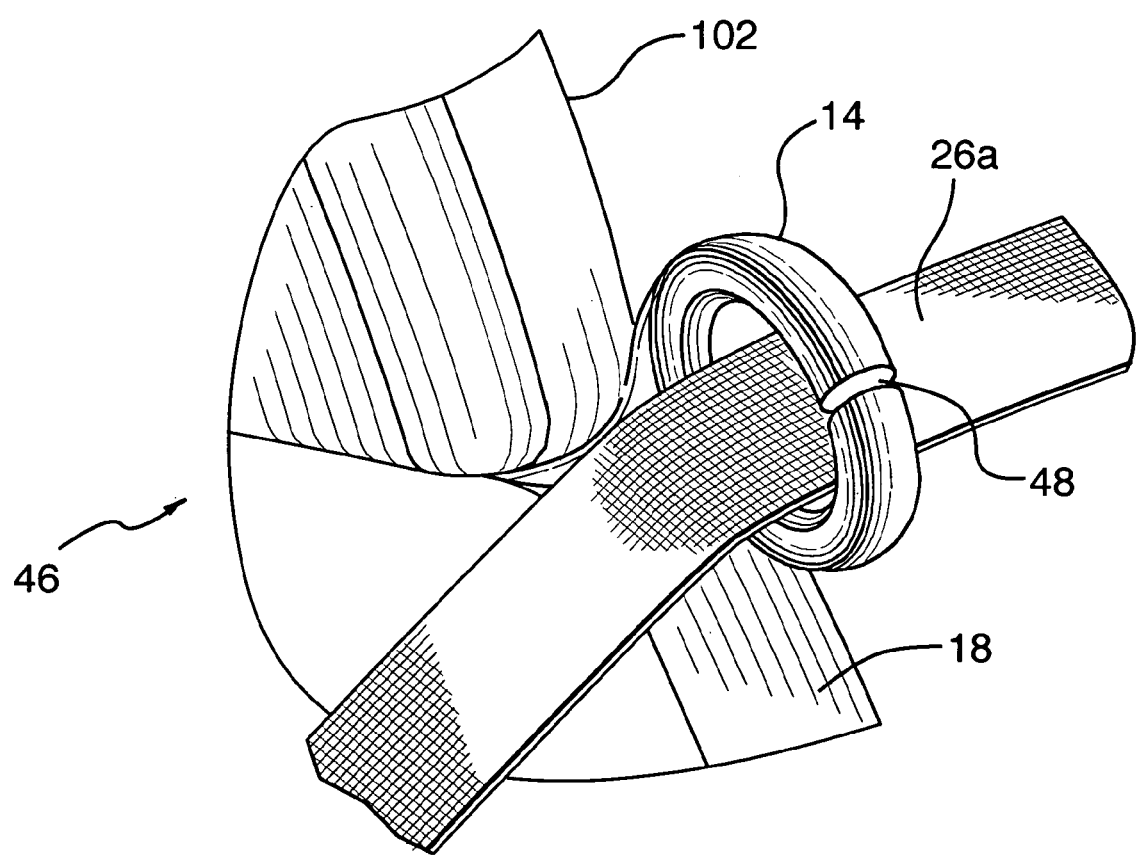

As illustrated in FIG. 1b such a prior-art webbing guide 14 is generally annular, and has a narrow slot 48 through which the seat-belt webbing 26 may be inserted into, or withdrawn therefrom. This known solution provides the advantage of situating the seat-belt webbing 26 inwardly, away from the B-pillar 38 adjacent to the upper portion 46 of the front seat assembly 16, where it is in closer relation to, and easier to grasp by, the front seat assembly occupant 40. However, it remains difficult for a front seat assembly occupant 40 to insert or withdraw the seat-belt webbing 26 from the narrow slot 48 of such a prior-art webbing guide 14, particularly when seated in the front seat assembly 16. For this reason, it is common for vehicle owners to leave the seat-belt webbing 26 inserted in the prior-art webbing guide 14 at all times. Referring again to FIG. 1a, it is apparent that when the prior-art webbing guide 14 is engaged by the seat-belt webbing 26 and the front seat assembly 16 is tipped forward, in the tipped configuration (FIG. 1a) the seat-belt webbing 26 poses an obstacle, or at least an inconvenience, for persons attempting to access the rear seat area 22 of the vehicle 12.

DETAILED DESCRIPTION OF A PREFERRED EMBODIMENT

The present invention will now be described in detail with reference to a preferred embodiment as shown in FIGS. 2a to 5b. While the present invention is described below with reference to a preferred embodiment, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers throughout.

An improved webbing guide for redirecting the seat-belt webbing 26 to a location adjacent to an upper portion 46 of the seatback member 18 of the vehicle seat assembly 16, is shown generally at 60 in FIGS. 2a to 5b, according to a preferred embodiment of the present invention.

Figure 2A:
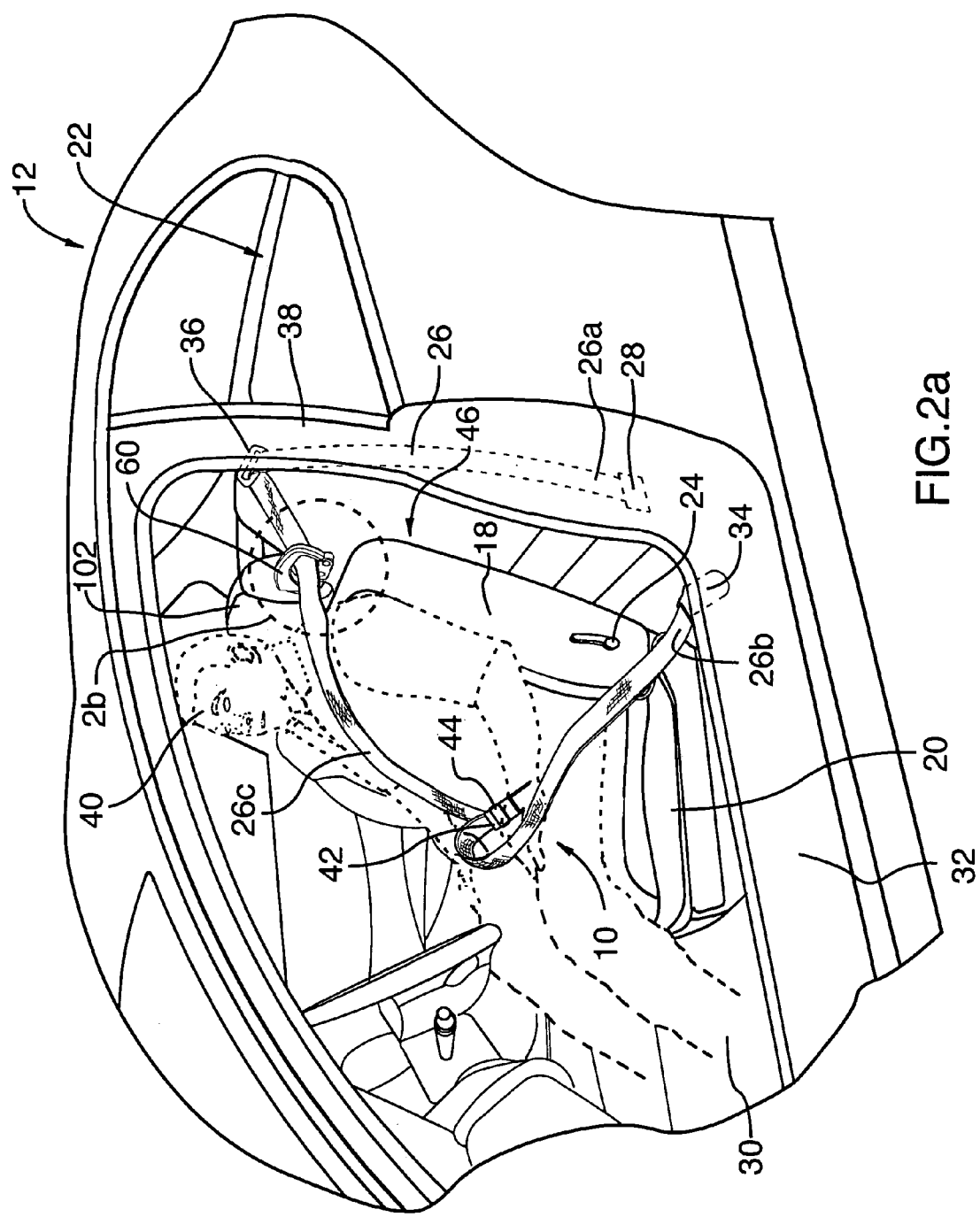
FIG. 2a is a front, side perspective view of a seat-belt webbing guide according to a preferred embodiment of the present invention, mounted to an upper seatback portion of a seatback member of a vehicle seat assembly in a two-door motor vehicle with a seat assembly occupant illustrated in phantom outline.
Figure 2B:
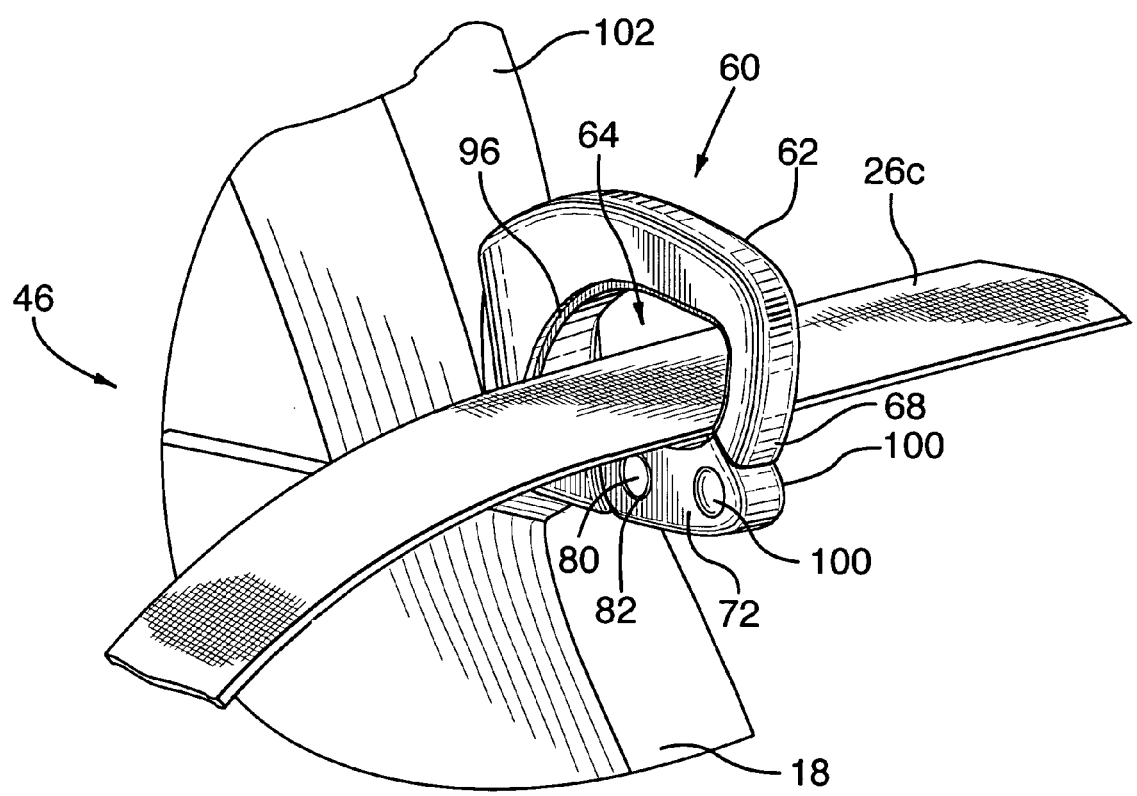

FIG. 2a is a front, side perspective view of the improved webbing guide 60 mounted on the upper portion 46 of a seatback member 18 of the front seat assembly 16 in a two-door motor vehicle 12 with a front seat assembly occupant 40 illustrated in phantom outline. FIG. 2b illustrates a blown-up perspective view of the improved webbing guide 60 in the closed configuration securing the seat-belt webbing 26 to the upper portion 46 of the seatback member 18. The improved webbing guide 60 allows for quick and easy selective disengagement of the seat-belt webbing 26 from the improved webbing guide 60 upon forward tipping of the seatback member 18 of the front seat assembly 16 to facilitate ease of access to the rear seating area 22 in the two-door vehicle 12. Additionally, the improved webbing guide 60 allows the front seat assembly occupant 40 seated in the front seat assembly 16 of the two-door vehicle 12 to readily and conveniently selectively secure the seat-belt webbing 26 to the improved webbing guide 60 without significant twisting or turning of his/her upper torso, thereby to readily have the seat-belt webbing 26 redirected by the improved webbing guide 26 to a convenient location adjacent to an upper portion 46 of the seatback member 18 for easy grasping by the front seat assembly occupant 40 to facilitate subsequent buckling operations.

Figure 2C:
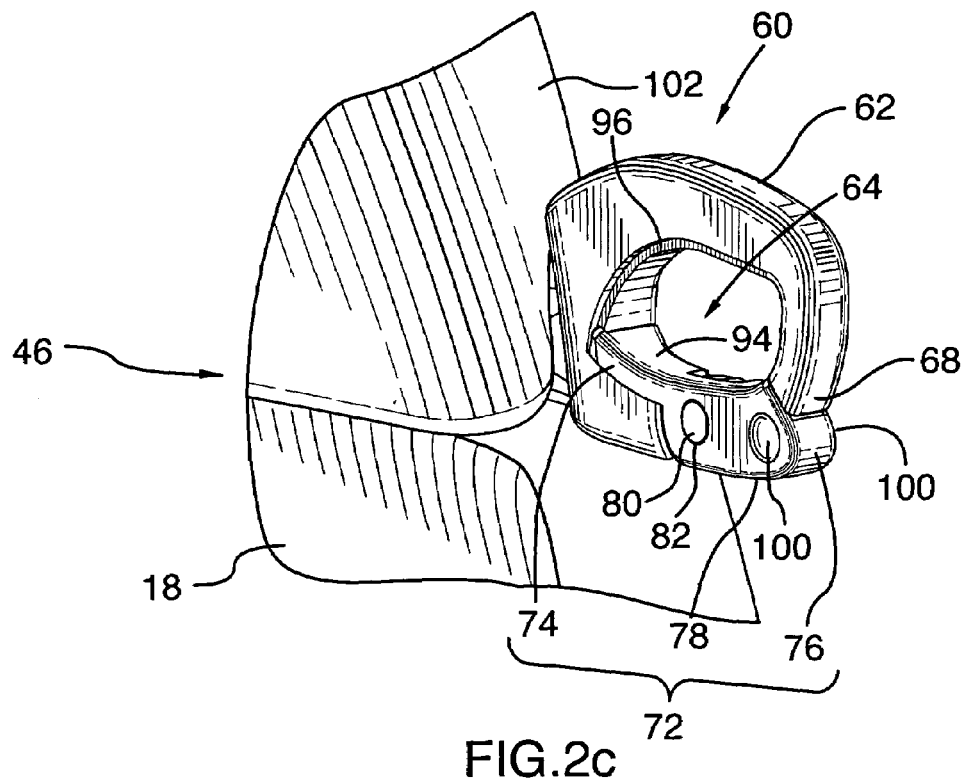
FIG. 2c is a blown-up perspective view of the encircled area 2b of FIG. 2a, with the webbing guide shown in its closed configuration and the seat-belt webbing removed for ease of illustration.
Figure 2D:
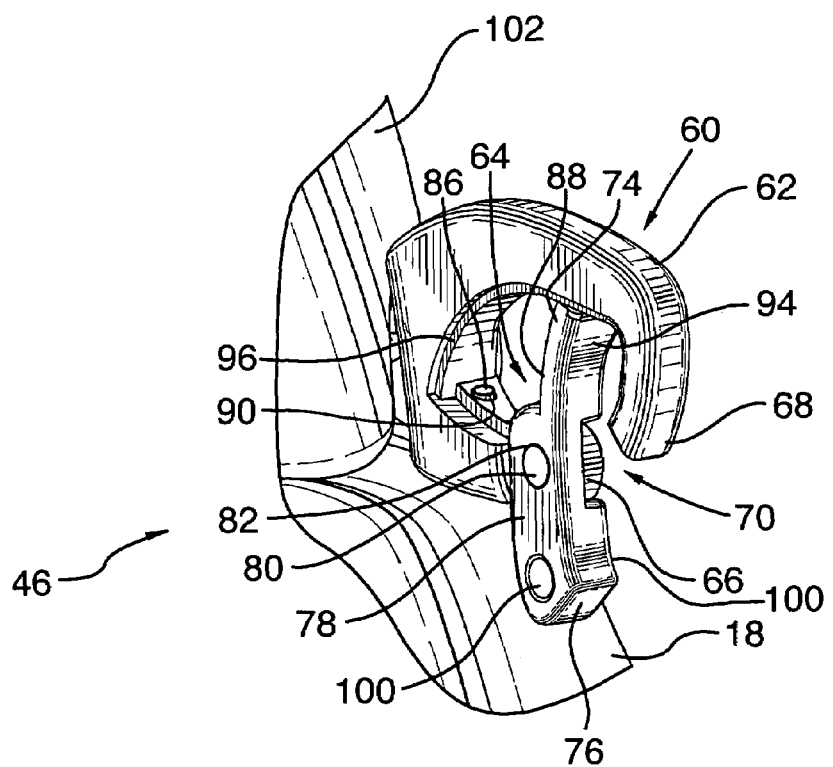
FIG. 2d is a perspective view of the webbing guide of FIG. 2c, shown in its open configuration.
Figure 3:
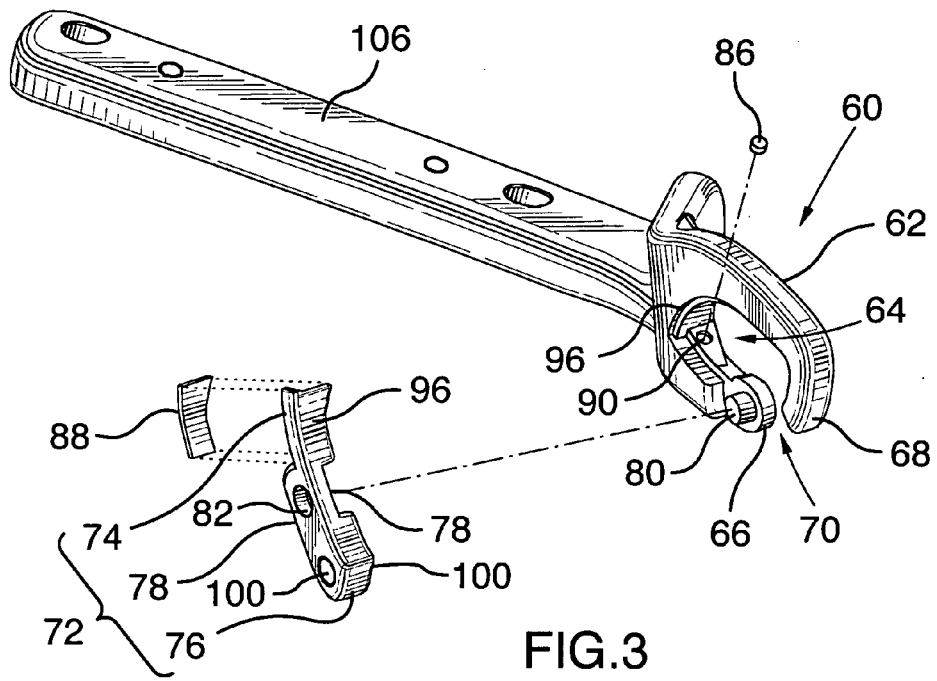
FIG. 3 is an exploded perspective view of the webbing guide of FIG. 2d.
Figure 5A:
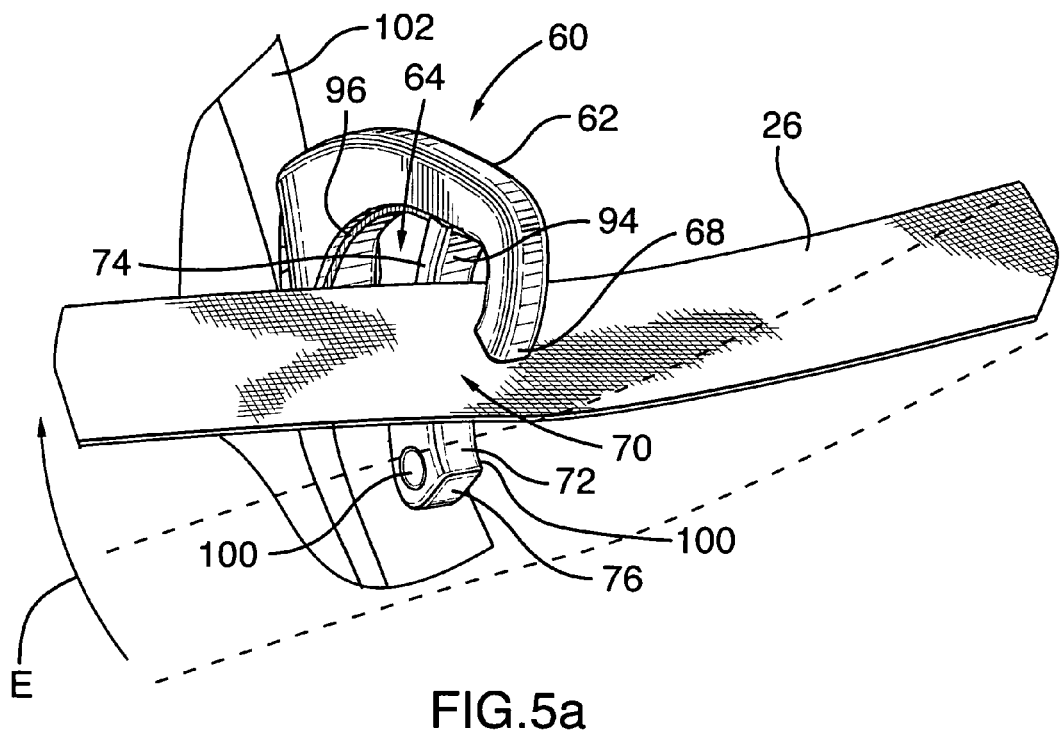
FIGS. 5a and 5b are a sequence of perspective views of the seat-belt webbing guide of FIGS. 2b, 2c and 2d illustrating the insertion of the seat-belt webbing into the seat-belt webbing guide.

The improved webbing guide 60 may be constructed of any suitable material and by means well-known in the art, such as for example by plastic molding techniques. As shown in FIG. 3 in an exploded perspective view, the improved webbing guide 60 comprises a guide body 62 which is substantially C-shaped, and mountable to the upper portion 46 of the seatback member 18. The guide body 62 defines a guide cavity 64 for admitting the seat-belt webbing 26. The guide cavity 64 according to the preferred embodiment of the present invention is generally ellipsoid in shape, however other shapes are contemplated including circular, triangular, square and rectangular shapes. Furthermore, the guide body 64 has a first guide portion 66 and a second guide portion 68, which together define a web-receiving passage 70 for facilitating insertion of the seat-belt webbing 26 into the guide cavity 64. Engaging the guide body 62 is a means for selectively securing the seat-belt webbing 26 to the guide body 62 in readily releasable relation. In the preferred embodiment illustrated, the securing means is an arm member 72 that is movable between a closed configuration (FIGS. 2c and 5b), and an open configuration (FIGS. 2d and 5a). The arm member 72 has a first arm end portion 74, a second arm end portion 76, and an intermediate arm portion 78 substantially juxtaposed therebetween. The arm member 72 is pivotally mounted on to the first guide portion 66 of the guide body 62 at the intermediate arm portion 78. Preferably the mounting between the intermediate arm portion 78 and the first guide portion is achieved through the use of a pintle 80, such that the arm member 72 can freely pivot between the closed configuration (FIGS. 2c and 5b), and the open configuration (FIGS. 2d and 5a). In the closed configuration (FIGS. 2c and 5b) the second arm end portion 76 releasably and substantially engages the second guide portion 68, and in the open configuration (FIGS. 2d and 5a) the second arm end portion 76 is spaced from the second guide portion 68.

The improved webbing guide 60 is designed and otherwise configured to be arranged in the open configuration (FIGS. 2d and 5a) when the seatback member 18 is positioned in the tipped configuration (FIG. 1a). When the seatback member 18 is positioned in the upright and occupiable, deployed design configuration (FIG. 2a) the improved webbing guide 60 is designed and otherwise configured to be arranged in the closed configuration (FIGS. 2c and 5b), with the intermediate portion 26c seat-belt webbing 26 passing therethrough, thereby being releasably secured at a location on the upper portion 46 of the seatback member 18. Constructing the arm member 72 such that the second arm end portion 76 has more weight than the first arm end portion 74 will help keep the arm member 72 gravity biased towards the open configuration (FIGS. 2d and 5a), when the improved webbing guide 60 is not in use (i.e., when the seatback member 18 is in its tipped configuration, thereby allowing the seat-belt webbing 26 to freely fall from the webbing guide 60 through the web-receiving passage 70, so as to avoid becoming an obstacle to access to the rear seat area 22 of the vehicle, as with the prior art webbing guide 14 illustrated in FIG. 1a.

One way of pivotally mounting the arm member 72 on to the first guide portion 66, as shown, is by constructing the guide body 62 so as to include a pintle 80 at the first guide portion 66, and mounting the arm member 72 securely to the pintle 80 via a complementary pintle bearing 82 located on the intermediate arm portion 78 of the arm member 72 so that the arm member 72 can readily pivot on the pintle 80. Alternately (and not shown), the pintle 80 may be located on the intermediate arm portion 78 of the arm member 72, and securely mounted to a complementary pintle bearing 82 located on the first guide portion 66.

Figure 5B:
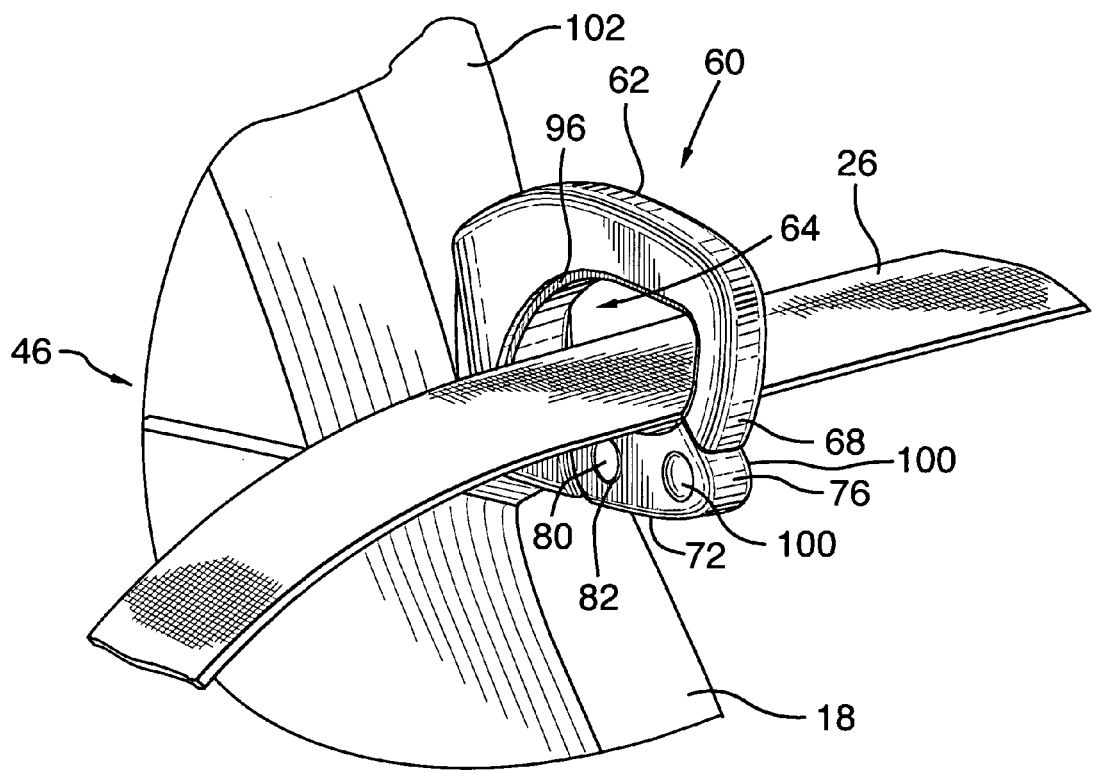

It is also preferable, but not required, for the webbing guide 60 to comprise a means for releasably retaining the arm member 72 in the closed configuration (FIGS. 2c and 5b), in order to secure the seat-belt webbing 26 within the improved webbing guide 60, when in use, as for example, when the seatback member 18 is in its upright and occupiable configuration. This may be accomplished through the use of a magnetic biasing means, which retains the first arm end portion 74 engaging the first guide portion 66 in readily releasable magnetically secured relation, when the arm member 72 is in the closed configuration (FIGS. 2c and 5b). Preferably, as illustrated in FIG. 2d, the magnetic biasing means comprises a magnetized portion 86 and a ferric portion 88. As illustrated, the first guide portion 66 preferably has the magnetized portion 86 affixed thereon and the first arm end portion 74 has the ferric portion 88 affixed thereon, which magnetized portion 86 and ferric portion 88 are arranged in operational alignment to one another.

In the preferred embodiment illustrated, the guide body 62 comprises a magnet receiving socket 90, best seen in FIG. 3, located proximate to the first guide portion 66, for housing the magnetized portion 86 in retained relation. In FIGS. 2d and 3, the magnet receiving socket 90 can be seen to be a cylindrical chamber open at the surface of the guide body 62, and being dimensioned so that the magnetized portion 80 will slightly protrude therefrom when inserted therein, as best seen in FIG. 2d.

According to the preferred embodiment illustrated, the arm member 72 further comprises an urging means for pivotally moving the arm member 72 from the open configuration (FIG. 2d) when the seat-belt webbing 26 engages the urging means during insertion of the seat-belt webbing 26 into the guide cavity 64 (FIG. 5a). The urging means preferably comprises a web-engaging surface 94 positioned on the arm member 72 substantially adjacent to the first arm end portion 66, such that the web-engaging surface 94 is engageable by the seat-belt webbing 26 during insertion of the seat-belt webbing 26 into the guide cavity 64 as the front seat assembly occupant 40 pulls the seat-belt webbing 26 with the tongue plate 42 over his/her upper torso towards the buckle device 44 to buckle same. In this manner, the web-engaging surface 94 leverages the arm member 72 to pivot about the pintle 80, from the open configuration (FIGS. 2d and 5a) towards the closed configuration (FIGS. 2c and 5b).

In the preferred embodiment illustrated, the guide body 62 further comprises an arm guiding groove 96, best seen in FIG. 3, which is engageable by the arm member 72. The arm guiding groove 96 substantially restricts movement of the arm member 72 to one plane, being the plane of rotation of the arm member 72. The arm guiding groove 96 is substantially an arc-shaped groove formed adjacent an external edge portion of the length of the guide body 62. The arm guiding groove 96 is traced by the first arm end portion 74 of the arm member 72 as it pivots between the closed configuration (FIGS. 2c and 5b) and the open configuration (FIGS. 2d and 5b). Furthermore, portions of the arm guiding groove 96 are engagable by the first arm end portion 74 of the arm member 72 as it pivots between the closed configuration (FIGS. 2c and 5b) and the open configuration (FIGS. 2d and 5a) under urging of the first arm end portion 74 of the arm member 72. This arm guiding groove 96 and first arm end portion 74 interactive design is intended to ensure that the arm member 72 pivots in one plane, thereby reducing the likelihood that the arm member 72 will be damaged if a force is applied to it perpendicular to its plane of movement.

As best seen in FIG. 2d, the improved webbing guide 60 is also preferably constructed with means for manually gripping the arm member 72 for movement thereof by a user who wishes to override the closing movement of the arm member 72 under the urging of the seat-belt webbing 26 as otherwise described herein. Although several different forms of gripping means are contemplated by the present invention, the gripping means illustrated comprises substantially concave depressions 100, 100 on opposite sides of the arm member 72 at aligned locations proximate to the second arm end portion 76. The concave depressions 100, 100 are preferably engageable one each by a thumb and index finger, thereby to facilitate the seat assembly occupant 40 manually moving the arm member 72 between the closed configuration (FIG. 2c) and the open configuration (FIG. 2d).

Figure 4:
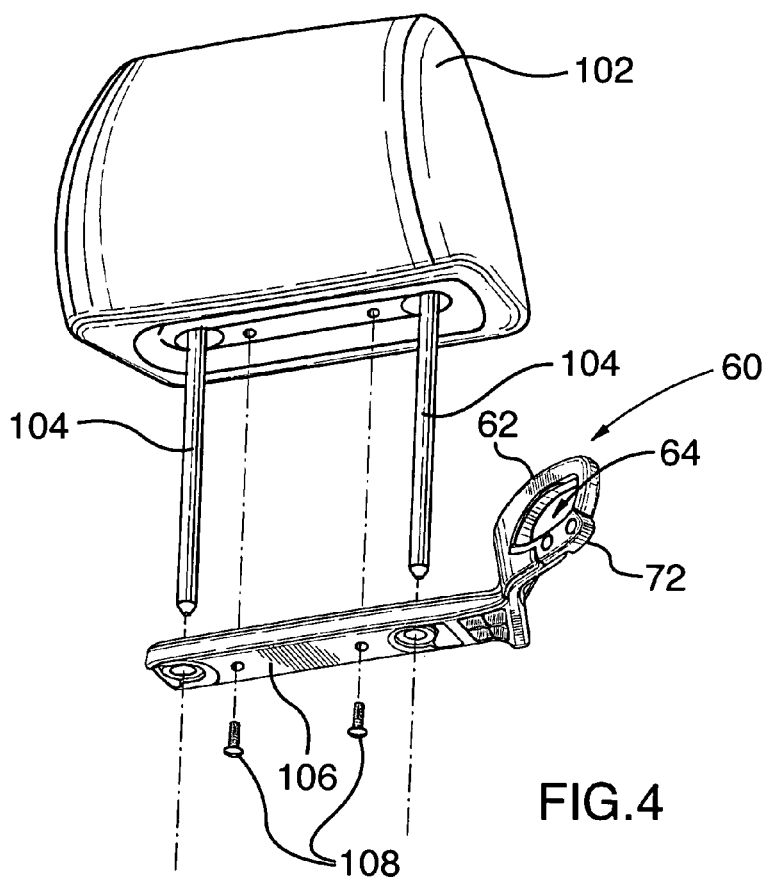

Referring now to FIG. 4, the improved webbing guide 60 is illustrated as being rigidly mounted to an underside of a headrest member 102, which headrest member comprises a component of the upper portion 46 of the seatback member 18. The headrest member 102 is of a conventional type, and can be slidably interconnected to the upper portion 46 of the seatback member 18 through two headrest posts 104, 104. Furthermore, the headrest member 102 is preferably vertically adjustable in any known manner along the axis of the headrest posts 104, 104. Mounting of the improved webbing guide 60 to the underside of the headrest member 102 is achieved through a mounting bracket 106 which extends from the guide body 62 in encircling relation to both headrest posts 104, 104 and secures to the underside of the headrest member 102 by means of screw-type fasteners 108, or the like. Although, FIG. 4 illustrates the improved webbing guide 60 mounted on to the underside of the headrest member 102, it is contemplated that the present invention is mountable on any upper portion 46 of the seatback member 18, including seatback members 18 which do not comprise a separate headrest member 102. It should also be understood that a person skilled in the art has at hand several methods and means of mounting such an improved webbing guide 60 on to an upper portion 46 of the seatback member 18.

FIGS. 2d, 5a and 5b illustrate, in sequence, the path of the seat-belt webbing 26 as it moves into the improved webbing guide 60, when the arm member 72 is initially in the open configuration (FIGS. 2d and 5a). Accordingly, FIG. 2d illustrates the improved webbing guide 60 with the arm member 72 configured in the open configuration ready to receive the seat-belt webbing 26. As the seat assembly occupant 40 pulls the seat-belt webbing 26 laterally across his/her upper torso to engage the tongue plate 42 with the buckle device 44 to buckle same, the seat-belt webbing 26 moves into the improved webbing guide 60 in the dissection of arrow "E" of FIG. 5a. As shown in FIG. 5a, the path of seat-belt webbing 26 into the improved webbing guide 60 is naturally from a position as shown in phantom outline, in the direction of arrow "E", and there through the web-receiving passage 70, into the guide cavity 64. As the seat-belt webbing 26 engages the web-receiving surface 94, the arm member 72 begins to pivot about the pintle 80 into the closed configuration, as shown in FIG. 5b, thereby releasably securing the seat-belt webbing 26 in the guide cavity 64.

Withdrawal of the seat-belt webbing 26 from the improved webbing guide 60 is accomplished by reversing the steps in the insertion sequence described above. Accordingly, withdrawal of the seat-belt webbing 26 from the improved webbing guide 60 in a direction generally opposite to that of arrow "E" of FIG. 5a may be achieved by applying a force on the second arm end portion 76 of the arm member 72, preferably by means of the seat-belt webbing 26, but also, optionally, by hand, causing the retaining means 84 to release, thereby allowing the arm member 72 to pivot about the pintle 80 into the open configuration (FIGS. 2d and 5a) and releasing the seat-belt webbing 26. The threshold force necessary to release the arm member 72 from the closed configuration (FIG. 5b) will be largely determined by the choice of magnetized 86 and/or ferric 88 portions employed in designing the retaining means 84. Ideally, tipping of the seatback member 18 into the tipped configuration (FIG. 1a) causes the seat-belt webbing 26 to exert sufficient force to release the arm member 72 from the closed configuration (FIG. 5b) and thereby automatically release the seat-belt webbing 26 under the influence of gravity and without the necessity of deliberate user intervention.

While the invention has been described in conjunction with a preferred embodiment thereof, it is evident that many alternatives, modifications, and variations will be apparent to those skilled in the art in light of the foregoing description, including routine variations and dimensions, shaping, choice of material, arrangement and substitution of parts.

For example, while the retaining means 84 is herein preferably described as a magnetic biasing means 84, the retaining means 84 may alternately comprise a capture ridge (not shown) positioned on the first guide portion 66 and a corresponding flexible or semi-flexible detent member (not shown) located on an underside portion of the first arm end portion 74 so as to selectively engage the capture ridge (not shown) for frictionally retaining the arm member 72 in the closed configuration of FIG. 2c.

As another example, while the urging means 92 is herein preferably described as a web-engaging surface 94 positioned on the arm member 72 substantially adjacent to the first arm end portion 76, it is also contemplated that the urging means 92 may comprise an electromotor (not shown) located in the area of the pintle 80 for moving the arm member 72 from the open configuration (FIG. 2d), when for example a sensor (not shown) connected to the urging means 92 is activated by the seat-belt webbing 26 as it passes into the guide cavity 64.

As a further example, alternate configurations of magnetized 86 and ferric 88 portions are contemplated for the retaining means 84, such that the first guide portion 66 may have the ferric portion 88 and the first arm end portion 74 may have the magnetized portion 86, so as to be arranged in operational alignment. Alternately, the second arm end portion 76 may have the magnetized portion 86 and the second guide portion 68 may have the ferric portion 88, so as to be arranged in operational alignment, or vice versa. Alternately, it is also expressly contemplated, without limitation, that both the first guide portion 66 and the first arm end portion 74, or the second guide portion 68 and second arm end portion 76, may have respectively affixed thereon polar-opposite magnetized portions 86, 86 arranged in operational alignment.

Accordingly, the present invention is intended to embrace all such alternatives, modifications, and variations as readily fall within the spirit and broad scope of the appended claims.

We claim:

1. A webbing guide for redirecting a seat-belt webbing to a location adjacent to an upper portion of a seatback member of a vehicle seat assembly, said webbing guide comprising:
   a guide body mountable on the upper portion of the seatback member; and
   securing means engaging said guide body for selectively securing the seat-belt webbing to said guide body in readily releasable relation, said securing means being moveable between a closed configuration and an open configuration,
   wherein, in said closed configuration, the seat-belt webbing is selectively securable to said guide body; and in said open configuration, the seat-belt webbing is readily releasable from said guide body;
   wherein said guide body defines a guide cavity for admitting the seat-belt webbing; and said guide body comprises a first guide portion and a second guide portion, which together define a web-receiving passage for facilitating insertion of the seat-belt webbing into said guide cavity, when said securing means is in said open configuration;
   wherein said securing means comprises an arm member having a first arm end portion, a second arm end portion, and an intermediate arm portion substantially juxtaposed therebetween, said intermediate arm portion being itself securely and pivotally mounted on said first guide portion, said second arm end portion being releasably engagable with said second guide portion, when said arm member is in said closed configuration, and said second arm end portion being spaced from said second guide portion, when said arm member is in said open configuration.

2. A webbing guide according to claim 1, wherein said guide body comprises means for releasably retaining said arm member in said closed configuration.

3. A webbing guide according to claim 2, wherein said means for releasably retaining said arm member comprises magnetic biasing means for magnetically biasing said arm member towards said closed configuration.

4. A webbing guide according to claim 3, wherein, in said closed configuration, said first arm end portion engages said first guide portion in readily releasable magnetically secured relation.

5. A webbing guide according to claim 4, wherein a first one of said first guide portion and said first arm end portion has a magnetized portion, and wherein a respective other one of said first guide portion and said first arm end portion has one of a ferric portion and a polar-opposite magnetized portion.

6. A webbing guide according to claim 5, wherein said guide body comprises a magnet receiving socket, proximate to said first guide portion, for housing said magnetized portion in retained relation.

7. A webbing guide according to claim 1, wherein said arm member comprises an urging means for pivotally moving said arm member from said open configuration when the seat-belt webbing engages said urging means during insertion of the seat-belt webbing into said guide cavity.

8. A webbing guide according to claim 7, wherein said urging means comprises a web-engaging surface positioned on said arm member adjacent to said first arm end portion, such that said web-engaging surface is engageable by the seat-belt webbing during insertion of the seat-belt webbing into said guide cavity.

9. A webbing guide according to claim 1, wherein said arm member further comprises gripping means for manually gripping said arm member for movement thereof between said open configuration and said closed configuration.

10. A webbing guide according to claim 9, wherein said gripping means comprises at least one concave depression located proximate to said second arm end portion.

11. A webbing guide according to claim 1, wherein the upper portion of the seatback member includes a headrest member.

12. A webbing guide according to claim 11, wherein the headrest member is slidably interconnected to the seatback member through at least one headrest post, and the headrest member is vertically adjustable along the axis of the at least one headrest post.

13. A webbing guide according to claim 12, wherein said guide body is rigidly mountable on the headrest member.

14. A webbing guide according to claim 13, wherein said guide body is mountable on an underside of the headrest member.

15. A webbing guide according to claim 14, wherein said guide body comprises a mounting bracket extending from said guide body in encircling relation to the at least one headrest post.

16. A webbing guide according to claim 1, wherein one of said guide body and said securing means comprises a pintle, and wherein a respective other of said guide body and said securing means defines a pintle bearing which operatively engages said pintle for pivotal movement of said securing means as aforesaid.

17. A webbing guide according to claim 1, wherein said guide body is generally arcuate and in one plane.

18. A webbing guide according to claim 1, wherein said guide cavity is generally ellipsoid.

19. A webbing guide according to claim 1, wherein said guide body further comprises an arm guiding groove engagable by said arm member for restricting movement of said arm member to one plane.

20. A webbing guide according to claim 19 wherein said arm guiding groove is engageable by said first arm end portion.

21. A webbing guide for redirecting a seat-belt webbing in a vehicle having a seat-belt system and a seat assembly of the type having a seat back member tippable between an upright, occupiable, deployed design configuration, and a tipped configuration affording ready access rearwardly of said vehicle seat assembly, said webbing guide comprising:

a guide body mountable to an upper portion of the seatback member, said guide body having a first guide portion and a second guide portion, said guide body defining a guide cavity for admitting the seat-belt webbing;

an arm member having a first arm end portion, a second arm end portion, and an intermediate arm portion juxtaposed therebetween, said intermediate portion being securely and pivotally mounted on said first guide portion, so as to constitute said arm member as a first class lever, wherein said arm member is movable between an open configuration and a closed configuration;

said first arm end portion defining a web-engaging surface engageable by the seat-belt webbing during insertion of the seat-belt webbing into said guide cavity when said arm member is in said open configuration, said web-engaging surface intended for leveraging said arm member from said open configuration when engaged by the seat-belt webbing; wherein a first one of said first guide portion and said first arm end portion has a magnetized portion, and wherein a respective other one of said first guide portion and said first arm end portion has a ferric portion; and a first one of said guide body and said intermediate arm portion comprising a pintle, and wherein a respective other one of said guide body and said intermediate arm portion defines a pintle bearing which operatively engages said pintle for pivotal movement of said arm member as aforesaid;

such that, in said closed configuration, said second arm end portion releasably engages said second guide portion with the assistance of the interaction between said magnetized portion and said ferric portion, allowing the seat-belt webbing to be selectively securable to said guide body within said guide cavity; and, such that, in said open configuration, said second arm end portion is spaced from said second guide portion, allowing the seat-belt webbing to be readily releasable from said guide cavity of said guide body.

* * * * *